SR
OR X 6,714
J. Stimpson,
Towing Vessels
No. 6,714 x
Patented Aug. 23. 1831.
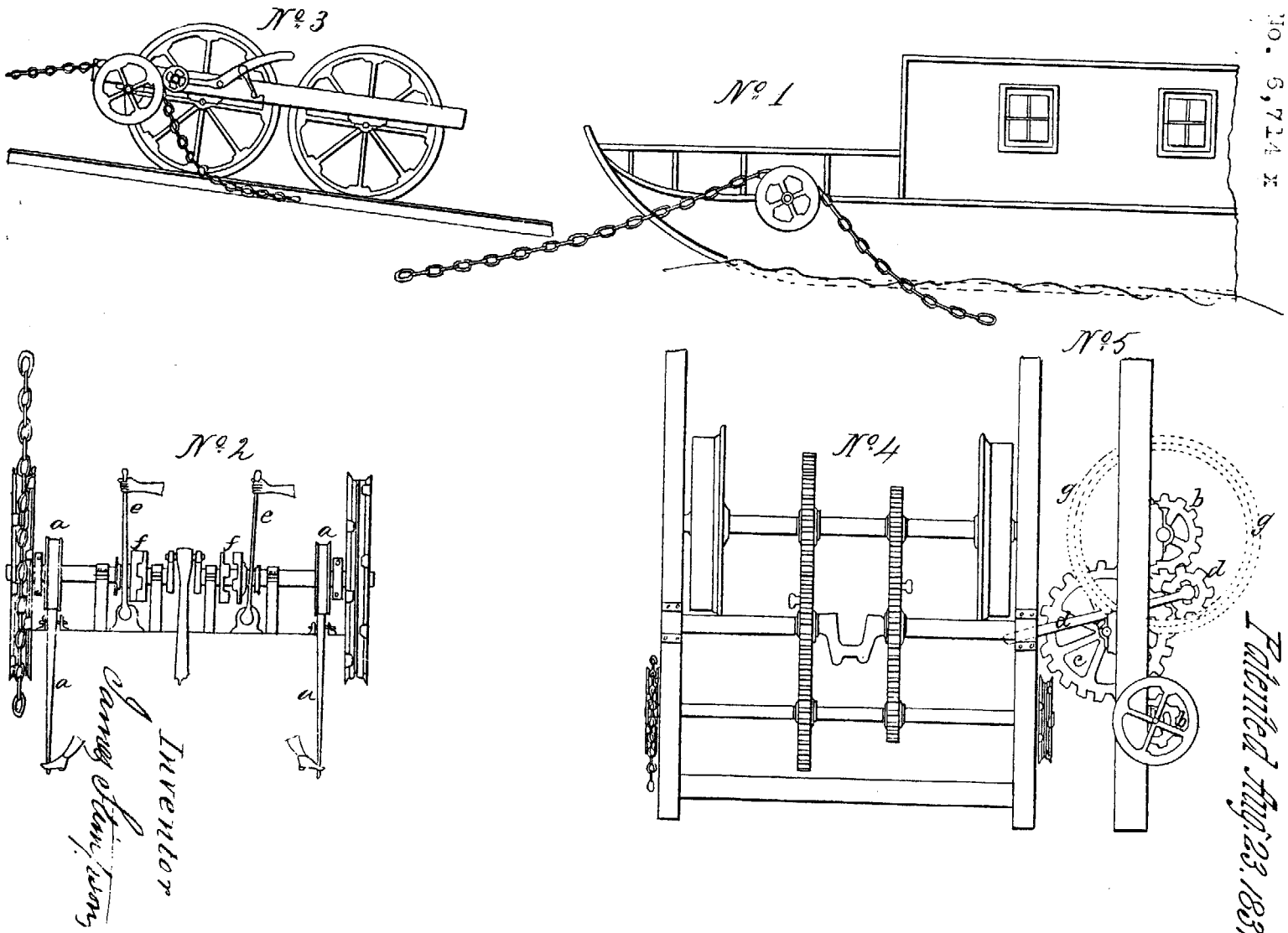
Inventor
James Stimpson
N. PETERS, PHOTO-LITHOGRAPHER, WASHINGTON, D. C.

X0006714

Aug. 23 1831

James Stimpson
Letters Patent

The Schedule referred to in these Letters Patent and making part of the same con-
taining a description in the words of the said James Stimpson himself of his im-
provement in the mode of ascending and descending Rivers and Canals or inclined
planes, using such Steam Engines or other locomotive power on board or within the
the vessels or vehicles to be moved as may be found necessary for their ascent or descent To all whom these Presents shall come Be it known, that I James Stimpson of the City and County of Baltimore and
State of Maryland have invented a new and useful improvement in the mode of ascend-
ing and descending Rivers and Canals or inclined planes on which locomotive engines
or any other kind of power, steam, or animal, may be used on board or within the ves-
sels or vehicles thereon: and that the following is a full and exact description of the
said invention or improvement as invented or improved by me viz: Firstly as to
the mode of passing over inclined planes, when the nature of the country over which it
is intended to build Rail Roads, is such: that a resort must be had to inclined
planes, to surmount elevations over which they must pass, and that in so abrupt
a manner that the power of locomotive Engines, or other powers, or the adhesion of
the wheels to the iron plate on which they run, would be inadequate to enable
them to surmount said elevations, more especially when incumbered with snow,
frost, ice or water; I propose to use chains of any kind, which may be found most
convenient; such as chains used for ships' cables, or any other that may be preferred,
in the following manner, take one or more such chains, stretch them somewhat
tight, and make them fast at both ends to something that is firmly fixed in the
earth near the foot and top of the incline; and so placed that the said chains
may lay their whole length upon the ground, or upon such other support as may be
provided; and on one or both sides of the tracks or in its centre as may be preferred;
the links of the said chains should be uniform in length and width, or very near
so. I also propose to have for carriages which are used as towing carriages or when
passing only by themselves, when they have the power of motion within themselves,
a shift, or change gear, that the operative power may be changed from the immedi-
ate at contact with the road wheels of said carriages, to that of a pulley shaft or any
other application designed for the same object, which pulley shaft may be placed
athwart the axis in front of the road wheels, or between them, or anywhere else that may
be found the most convenient for it which shaft may have several sets of pulleys side
by side upon it, at each end, or if the chains are laid in the centre of the track, and
sufficient room can be had beneath the bottom of the car, or over it for its use in that
place or situation, the pulleys may then be fastened upon said shaft in its middle
or centre, which pulleys may be of as many and various sizes as there may be variations
of ascents in the different inclines to be passed over; and be all made fast to said
shaft side by side of each other, the like number upon each end of said shaft if for
two chains. but if for one chain only, and that in the middle, then one set of pulleys
will be sufficient; said pulleys should only occupy as much room widthways, as
is necessary for their proper strength; and to receive the chains in the centres of
their peripheries, having a thin flange between each and on each side of them to serve
as a guide to the chain, said pulleys should be made of cast iron or other metal,
and be cast in two pieces flat ways, each separated in their centres with the flange
upon the side opposite to that which is to join when put together. The form
and size of one half of the chain which may be used, must be indented and accurate-
ly cast upon the edge of the peripheries of said pulleys between the flanges so that
when two of said pulleys shall be put together upon the shaft, with the flanges out
the peripheries of said pulleys between the flanges, will then have cavities or cells of
the form and size just right to receive the links of said chains; one link lying
flatways in a cell sunk nearly or quite its whole depth more or less, below the surface
of the peripheries of said pulleys, the next link perpendicularly, the next flat again,
and so on alternately throughout their whole surface. I also propose to have a set
of small pulleys centred upon one end of a lever that they may be raised or depress-
ed at pleasure by the means of said lever, and to be placed immediately over and to run
upon the first named pulleys, but only so thick upon their peripheries as to nearly [illegible]
the space between the flanges of those first described; the last mentioned pulleys
must have a groove or channel in the centre of them, all round, which channel
must be of sufficient width and depth to receive the links of the chains which may
lay in the under pulleys edge ways, or up and down, the surface of the peripheries
on each side of said channel should run upon the links which lay flat ways.
said lever on which the pulleys now should be centred at a proper distance from said
pulley, upon a fixture attached to the carriage; so that said lever having a hand-
le with a catch or fall attached to it may when the aforesaid chain is to be plac-
ed upon the aforesaid under pulley be raised up to allow said chain to pass in be-
tween them and then forced down again close upon the chain and be held by the
aforesaid catch or fall. thus the peripheries of the upper pulleys run upon the chain
and turn upon their own shaft and pivots by contact merely with the chain
holding it down in the cells in the under pulley, to prevent its rising, slipping
or rendering, or the aforesaid under pulley may have teeth or any other contriv-
ance whereby to hold fast to said chain. These pulleys should lay as near to
the ground as may be with safety. To use this improvement when you arrive with
a car at the foot of an inclined plane, you will stop and place the chain between
the pulleys, change the power from the road wheels to that of the pulley shaft:
and supposing that the road wheels are three feet diameter, and the inclination of
of the incline plane about to be ascended is such that the opposition to motion by
gravity is just equal to all the friction, or what the opposition to motion was up-
on the plain or level road, or in other words, if the gravity added to the friction
is such as to require just double the power it did to travel the level road, then
then put the chain upon a pulley of eighteen inches diameter, that being half the
size of the road wheels, the same engine or power used upon the plane will enable
you to ascend the incline, as there is no loss of power or increase of friction in any
degree, the chain being merely raised in front and dropt again behind as fast as the
engine runs upon the road, it is in perfect balance over the pulley with itself all the
while, and as there is no rendering movement of the chain upon the ground to be encoun-
tered, there can be no loss of power, but the speed in this case will be diminished one
half during its ascent; when you have arrived at the summit of the incline or
a little past, cast off the chain upon the ground, change the power back again
to the road wheels, and go on as usual. Again suppose there should be three sets of
inclines, all necessarily differing one from the other in the angles of their inclination, and
that it would be desirable to pass the whole of them with the same engine, then have
three sets of pulleys side by side permanently fixed upon the same shaft as before de-
scribed, each of a size proper for the different inclines to be passed over. Thus the
whole length of the road may be travelled with the same power, and that also
independent independent of the adhesion of the wheels to the rails. Any further degree of power,
independent of the size of the pulleys to that of the road wheels may be acquired by
placing a large wheel upon the pulley shaft and a small one on the crank shaft which
last is to drive the first named. The necessary change of the power from the
road wheels to the pulley shaft on board the locomotive engines, or any other kinds
of carriages, may be accomplished in various ways; but the following may suffice as
one, which will answer, and which I now propose. Where roads are crooked and much
speed is desired it will be necessary to use gears, hence two gear shafts and wheels
will be already provided for our purpose, another upon the aforesaid pulley shaft
is all that will be necessary provided the crank shaft that receives the power first
from the engine or other power is so constructed that it can be made to slide suffi
ciently to change the contact of the cogs or teeth of the wheel on the crank shaft.
from the pinion or wheel on the road wheel axle, to that of the aforesaid pulley shaft
whereby the object will be accomplished, and as the necessary movement required
is but about two and a half inches, it can be done with safety, by levers or screws,
or any other way which may be desired; the boxes or pillow blocks in which the
crank shaft revolves may be connected to long wide iron plates fitted close
down upon permanent rails or fixtures, which plates we will call slide plates,
and use them as such, and to secure them from lateral movement we will have
starts or ears projecting up from the permanent rail close to the outer edges on
both sides and within about six inches of each end of said slide plates, there
should be two levers wide enough at the place where centred to cover said slide
plates, the handle ends splicing by each other to a convenient length, said levers
to be centred in or upon the aforesaid starts or ears, with a wedge pendant
from the under side and at the end of said levers, which wedge is to pass
down between said plates and a permanent start or fixture to the permanent
rails, said wedge to be thick enough to make the necessary movement for the
change of the gears, the same at both ends of said plates, there must also be a
start within the centre of said lever, underneath, extending the whole width
and three inches more or less, within its centre; the object of which is that when
said lever handle is thrust down sufficient to raise the aforesaid wedge to
allow said slide plate to move its proper distance, and then immediately after
the aforesaid starts underneath the lever is to bind down firm and hold fast that that end of said slide plate, the handle end of said lever may be sprung under
a spring catch, whereby to hold it securely. It will now be seen that the handle
end of this lever is down and binding said slide plate at that end firm up-
on the rail or its bed underneath and that the wedge is out; also it should be
understood that the opposite lever at the opposite end of the aforesaid slide plate
at the wedge, or its outer end is down and that its wedge is thrust down be-
tween the end of the slide plate and the permanent fixture upon the rail and
at the same time the under edge of said lever just within the wedge, by its small
stud or projection should come in contact with the upper surface of the afore-
said slide plate, and by a spring catch or prop underneath the handle end of
said lever, bind down or hold fast said slide plate as before set forth at the op-
posite end: thus it will be seen that by casting off the aforesaid spring catches
or props, the levers become loose, and also the slide plates beneath them, except end-
ways which until the levers are moved is or should be held firm by the wedges,
and that by lowering the handle end of the lever that was up, it will raise the
wedge at the opposite end and thereby permit the slide plate to move that way
and by raising the handle end of the opposite lever it will thrust down its wedge
and cause said slide plate to move the opposite way, and at the same time con-
fine it permanently endways, and then by passing the handles under the spring
catches, &c. it will be confined every way; thus the aforesaid levers are made to move
the aforesaid slide plates, whereby a change of gears is effected, and at the same
time, serve as binders to hold said slide plates as secure as in any other way.
The same application as herein set forth, or apparatus must be applied at the
opposite end of the aforesaid crank shaft. The handle ends of the aforesaid levers
which are abreast of each other transversely of the carriages, may be connected by
a bar which will afford the means of moving the slide plates on each side of the
carriage simultaneously; or the aforesaid movement of the crank shaft by that
of the aforesaid slide plates may be effected by wedges or keys to be acted upon as a-
foresaid by levers, or any other ways; these wedges or keys passing the outer ends of
the boxes in which the journals of the shaft revolves through the cap and bed be-
tween which said boxes are confined and the pillar blocks omitting thereby the
slide plates altogether. The chief objection to the aforesaid movement of sliding the
crank shaft is that of its connection to the eccentrics motion which operates the
steam steam valves which in this case must necessarily be applied in another way, or
performed upon some other shaft so placed as to admit of the change, or the vari
ation may be permitted by the connecting rod, by its having two centres among other
ways. I also propose another mode, which may be effected as follows; viz. Put two
wheels upon the crank shaft thick about the eye and loose upon said shaft,
let starts or knobs be cast upon the insides of the rims of said wheels, then fix upon
said shaft between said wheels, a slide coupling so made that it cannot turn up
on said shaft without turning it, but can move side ways, said coupling may
be in form of a blank wheel, with starts or knobs projecting each ways, which starts
or knobs should be made so as to mesh in between the first named starts upon the
inside of the rims of the two gear wheels, having a groove in said slide coupling
in which the end of a lever must be fitted whereby to move said coupling up
to either of said wheels, the starts upon each will intersect each other, by this
means this wheel becomes a fixture to said shaft and cannot turn round
without said shaft turns with it, the coupling being of itself a fixture to
said shaft; in which situation of said coupling it is wholly disengaged from
the other wheel. And we will suppose, that this wheel now made fast as afore-
said is in contact with the wheel upon the before mentioned pulley shaft,
and thereby puts that shaft into motion, the other wheel upon the crank shaft
upon the opposite side of the slide coupling, is in contact always with the
wheel upon the road wheel axles, but that being disengaged from the coup-
ling is entirely free to turn loose upon the crank shaft which causes no other
friction than simply its revolving upon said crank shaft: the wheel itself
performing no operation at that time; all the work being performed by the
pulley shaft when the other is loose, change the coupling to intersect the wheel
in contact with that on the road wheel axle and the carriage will be moved
by the revolving of the road wheels and their adhesion to the rail plates, and
in this case the pulley shaft will lay still, the wheel on the crank shaft
becoming or being of itself loose upon said shaft. The aforesaid change of
gears, or the power from one object to the other, may be effected as follows;
Place one gear wheel upon the road wheel axle, one upon the crank shaft,
one upon the pulley shaft, all in range of each other, taking care that the
wheels upon the crank shaft, does not touch either the one upon the pul
ley ley shaft, or that upon the road wheel axle at any time, and also that these
be permanently fixed in their several places, then centre a fourth wheel
upon the short end of lever, so placed as always to be in contact with the
crank shaft gear, and by this medium of the lever made to remain con-
tact alternately with the gear upon the pulley shaft or that upon the road
wheel axle, and thus by its change from one to the other, the pulley shaft and
the road wheel axle may either of them be made to revolve at pleasure, or it
may be done in any other way, I also propose in the same way, or by any
other means to effect various speeds or powers from the same crank shaft,
with gears, in a similar way, only varied in size, for instance, let there be
two or three sized wheels placed fast upon the road wheels axle, the first
with twenty teeth, the second with thirty, the third with forty, also place
the same number of wheels upon the crank shaft loose, reversed in size to
those on the road wheels axle, all meshing together at the same time mak-
ing either of them fast upon the crank shaft by the aforesaid slide coupling
or bayonets or any other way, the speed of the carriage will correspond to
the proportions of the variations between the driver and the driven, and thus
when the smallest wheel upon the crank shaft is made fast to it by the
couplings or bayonets, that wheel of course meshing into the largest upon
the road wheel axle, they having the one say twenty, and the other forty teeth,
it will require two revolutions of the crank shaft to produce one revolution
of the road wheels, hence you may ascend inclines where the adhesion of the
wheels are sufficient, but would otherwise lack power to move a load that
the same power would draw upon perhaps nineteen twentieths of the route
on which we suppose there are no inclines, hence with this application a
full load may be moved the whole length of a road which would be an im-
mense gain costing only a part of the speed for one twentieth of the distance,
and permitting one third or one half more to be drawn with the same power
over the entire route. and during high adverse winds a constant motion may
be kept by using the variable powers or speeds aforesaid when without them
you might be compelled to stop or abandon part of the load or greatly overstrain
the boiler. Thus by these variable gears powers, and speeds, and the applica-
tion of the pulley shaft and chains, inclines of almost any description may be
(passed)

passed over with burthens that would be full for the engines upon the level road, which finally accomplishes with the least possible expenses all that has been done by locomotives and stationary power, at a cost of [illegible] part of these powers when passing inclines, which comparing time with power is a gain, for in the proposed plan, the locomotive power will be working constantly with its whole power in any or all situations, whereas the stationary power would necessarily be idle more or less of the time, although kept ever ready for use at great expense and when used being encumbered with ropes or chains, which it has to draw over a long distance, thereby requiring a great power, notwithstanding said ropes or chains may be supported by friction rollers, the whole length of the incline an expensive arrangement which by the improvement here proposed will or may be dispensed with.

Secondly, I also propose to apply the said improvement, to on board of the boats, with chains and pulleys as aforesaid, for the use of towing boats or vessels of any kinds, in rivers and canals or elsewhere, by the means of machinery moved by steam or any other power, applied to the aforesaid pulleys, and they acting upon the chains as aforesaid, said chains should be made fast at each end to such fixtures, and in such suitable places on the rivers, canals, bays, Harbours, and elsewhere, as shall be deemed most convenient or useful, and to lay upon the bottom of said rivers, canals, bays, harbours, &c under the water, or on any kind of support which may be preferred, there may be two chains one to draw by in one direction, and the other chain for the opposite direction, or one only may be used, with a general understanding that those passing in one direction, when meeting a vessel, shall let go the chain pass and take it up again, said chains may be made fast by hooks or otherways, to ring bolts in the abutments of locks or such other fixtures as shall be preferred, and in as many different lengths or places as shall be found necessary). In this case the power must be on board of the towing vessels and it should be applied direct to the aforesaid pulley shaft, no change of speed or power being required as in planes and inclines, or it may be in any other way. This application of power in tow boats or vessels acting upon the chains as aforesaid, will do away the necessity of the tow paths, thereby saving the banks of said canals, rivers &c: and allowing them to be reserved for rail roads and other purpo se es. The aforesaid pulley shaft may lay athwart the vessel with pulleys upon
its chains as before described, and of such size, as shall produce a speed com-
pared with that of the animal, steam, or other power, as may be thought most
useful, if animal power be used, it may be upon horizontal wheels, or move-
able floors such as I use for my patent horse low carriage upon rail roads,
or in any other way desired.

What I claim as my invention or improvement is
the application of chains to ascend and descend upon Rivers and canals, or in-
clined planes, or Rail roads, or otherwise, said chains being made fast at
both ends near the foot and top of the inclines, and resting upon the ground
or other material or at suitable places in Rivers or Canals, the Locomotive
or other Engines, drawing themselves up or letting themselves down said inclines
Rivers or Canals, by the power which is on board of themselves, by the agency
of pulleys in contact with said chains as set forth in this specification, or in
any other way, also the variable speeds, or powers herein set forth, or in any
other way. For Locomotives or other self moving carriages upon Railroads
not using the chain. I also claim the application of machinery to change the
moving power from the road wheels of Locomotives upon rail roads where
the inclination is too much for the adhesion of the wheels to the rail plates
to allow them to ascend or descend, without slipping or sliding upon said
rails, to a pulley shaft as aforesaid, or any other thing, whereby said power
is used in a different manner than in immediate contact with the road
wheels or their axles as set forth in this specification or in any other way.

Witnesses
William A Stimpson
Geo S. Eichelberger

James Stimpson 4245 words (Aug. 23. 1831.)